United States Patent
Couetoux et al.

(10) Patent No.: US 8,989,993 B2
(45) Date of Patent: Mar. 24, 2015

(54) METHOD FOR CONTROLLING THE STARTER OF A COMBUSTION ENGINE AND APPLICATION THEREOF

(75) Inventors: Herve Couetoux, Les Molieres (FR); Nicolas Guilloz, Clamart (FR); Olivier Scheffges, Courbevoie (FR)

(73) Assignee: Renault S.A.S., Boulogne-Billancourt (FR)

( * ) Notice: Subject to any disclaimer, the term of this patent is extended or adjusted under 35 U.S.C. 154(b) by 1312 days.

(21) Appl. No.: 12/809,827

(22) PCT Filed: Dec. 18, 2008

(86) PCT No.: PCT/EP2008/067893
§ 371 (c)(1),
(2), (4) Date: Feb. 4, 2011

(87) PCT Pub. No.: WO2009/083477
PCT Pub. Date: Jul. 9, 2009

(65) Prior Publication Data
US 2011/0118962 A1    May 19, 2011

(30) Foreign Application Priority Data
Dec. 20, 2007   (FR) .................................... 07 08950

(51) Int. Cl.
*G06F 19/00*    (2011.01)
*G06G 7/70*    (2006.01)
(Continued)

(52) U.S. Cl.
CPC ........ *F02N 11/0844* (2013.01); *F02N 11/0855* (2013.01); *F02N 11/087* (2013.01); *F02N 15/06* (2013.01); *F02N 2200/048* (2013.01); *F02N 2300/102* (2013.01); *Y02T 10/48* (2013.01)
USPC ...................... 701/113; 123/179.1; 123/179.4

(58) Field of Classification Search
CPC ... F02N 11/087; F02N 11/0851; F02N 11/08; F02N 15/067; F02N 2300/102; Y02T 10/48

USPC .................. 123/179.1, 179.25, 179.3, 179.4; 701/113; 73/114.59; 290/30 R, 31, 36 R, 290/38 R, 38; 322/37
See application file for complete search history.

(56) References Cited

U.S. PATENT DOCUMENTS 4,418,289 A * 11/1983 Mortensen ..................... 307/142
6,759,756 B2 * 7/2004 Shiga et al. .................. 290/38 R
(Continued)

FOREIGN PATENT DOCUMENTS

| DE | 100 05 005 | 10/2000 |
| EP | 1 041 277 | 10/2000 |
| WO | 2007 101770 | 9/2007 |

*Primary Examiner* — Mahmoud Gimie
*Assistant Examiner* — Sizo Vilakazi
(74) *Attorney, Agent, or Firm* — Oblon, McClelland, Maier & Neustadt, L.L.P.

(57) ABSTRACT

A method for controlling actuation of a control device to be integrated into a starter of a combustion engine. The device includes a solenoid controlling a position of a starter sprocket capable of being inserted into a ring gear kinematically connected to a crankshaft of the engine. The sprocket can be driven by an electric motor of the starter by closing a first switched power line between a battery and the starter. The device includes an auxiliary relay and at least one power resistor mounted in series, thus forming a second switched power line parallel to the first switched line for powering, with a supply current lower than the maximum current, the electric motor of the starter driving the sprocket. The method switches the auxiliary relay to accelerate the sprocket of the starter, determines rotation speed of the ring gear, determines duration of the acceleration phase of the sprocket, inserts the sprocket of the starter into the engine ring, switches the first switched power line, withdraws the sprocket of the starter from the engine ring, and cuts any power supply to the electric motor of the starter.

10 Claims, 2 Drawing Sheets

(51) Int. Cl.
*F02N 11/08* (2006.01)
*F02N 15/06* (2006.01)

(56) References Cited

U.S. PATENT DOCUMENTS

| | | |
|---|---|---|
| 2002/0053961 A1* | 5/2002 | Kajino .......................... 335/126 |
| 2004/0017086 A1 | 1/2004 | Shiga et al. |
| 2004/0107931 A1* | 6/2004 | Nagai et al. .............. 123/179.25 |
| 2007/0084429 A1 | 4/2007 | Taki et al. |
| 2010/0251852 A1* | 10/2010 | Murata et al. .................... 74/7 A |
| 2011/0132307 A1* | 6/2011 | Patterson et al. .......... 123/179.3 |
| 2011/0137544 A1* | 6/2011 | Kawazu et al. ................ 701/113 |
| 2011/0155085 A1* | 6/2011 | Hirano et al. .............. 123/179.3 |
| 2011/0202254 A1* | 8/2011 | Ishikawa et al. .............. 701/103 |
| 2011/0270512 A1* | 11/2011 | Hayashi et al. ................ 701/112 |
| 2011/0277728 A1* | 11/2011 | Schoenek et al. ............. 123/320 |

* cited by examiner

METHOD FOR CONTROLLING THE STARTER OF A COMBUSTION ENGINE AND APPLICATION THEREOF

BACKGROUND

The subject of the present invention is a control method for activating a control device designed to be incorporated into a starter for a combustion engine, the device comprising a solenoid controlling the position of a pinion of the starter suitable for being engaged in a ring gear kinematically associated with a crankshaft of said engine, said pinion being able to be driven by an electric motor of the starter by closing a first switched power supply channel between a battery and the starter, the device also comprising an auxiliary relay and at least one power resistor placed in series creating a second switched power supply channel in parallel with said first switched channel and making it possible to power, via a power supply current that is weaker than the maximum current, the electric motor of the starter driving said pinion.

This invention falls within the context of current automobile technology, notably the context of the starters of heat engines having the functionality commonly called "Stop & Start". This functionality consists in automatically stopping the engine when the vehicle speed is zero, for example when stopped at a red light or in any other situation requiring the vehicle to stop, the engine subsequently being restarted automatically when the user activates it again. The object of this is to reduce the consumption of the vehicle and the pollution that it generates. In order to achieve this "Stop & Start" function also called "S&S" on a vehicle with a heat engine, notably on an automobile, while retaining a simple onboard electric system, normally a 14V system, there are currently mainly two possibilities based on electro-magnetic automobile starting members. Either an alternator-starter is used which is a reversible machine placed on the belt of the engine or a starter is used suitable for the S&S function with respect to power, noise, wear, etc. This type of starter, during the starting phase until the engine is running independently through the combustion cycles, drives the crankshaft of the heat engine via a pinion which engages on the teeth of a ring gear mounted on the periphery of the engine flywheel, the engagement of the pinion in the ring being controlled by a solenoid arranged in the starter.

The use of an S&S starter mentioned above provides a very marked potential to reduce cost relative to an alternator-starter and is of value notably for generalist automobile manufacturers who are concerned about the cost-benefit ratio of their products. This kind of starter has been improved in the past, for example in the control of the current of its solenoid, for which an electronic chopper as explained in documents DE 10 034 779 and U.S. Pat. No. 5,818,679 has been proposed, in order to achieve a progressive engagement of the pinion in two stages, see for example documents U.S. Pat. No. 6,104,157 and U.S. Pat. No. 6,323,562. Similarly, a solenoid having a single coil with two stages has been proposed for such a starter.

A control device designed to be incorporated into such a starter and corresponding to the kind mentioned above has also been produced by the applicant and is the subject of patent application FR 0 606 740. This control device makes it possible to limit the power consumed by the electric starter during the starting of the combustion engine, by clipping the current when the starter is switched on.

Currently, the automobile manufacturers are seeking to further improve this kind of "Stop & Start" starter, in particular because it would be desirable to have additionally a function called "reflex-start". The "reflex-start" function consists in restarting the engine via the starting member while the engine crankshaft, unlike the situation of a usual starter, is not immobilized, following a rapid succession of instructions, for example following a stop and then a restart in less than a second. This kind of situation may notably occur in the event of the immobilization of an automobile at a red light that has just switched to green, during a change of speed when entering a rotary intersection or a give-way point, etc. The aforementioned alternator-starter system makes it possible to carry out the "reflex-start" function because the coupling via the belt of the reversible electric machine with the crankshaft of the engine naturally synchronizes the rotation speed of the machine with the crankshaft, give or take the drive ratio. It is therefore sufficient to power the electric machine in order to supply immediately, that is to say as soon as the currents in the electric machine are established, a drive torque to the heat engine. But, as mentioned above, the cost of an alternator-starter remains high relative to an S&S starter, thus pushing the automobile manufacturers to find an alternative solution.

On the other hand, the current S&S starters, respectively their control devices, do not make it possible to perform such a "reflex-start" function because this requires a synchronization of the rotation speeds of the pinion and of the ring before their mutual engagement, the engine, respectively the crankshaft, again rotating in this constellation. A starter fitted with a normal solenoid starter drive assembly actually powers the electric motor driving said pinion of the starter only when the core of the solenoid is at the end of its travel, that is to say when the pinion is engaged or otherwise in a tooth-against-tooth position with said ring gear followed by an engagement. An operation of engaging the pinion on a ring in rotation risks causing the teeth of the pinion to rebound against the teeth of the ring with noise and wear effects and even breakage of teeth which is unacceptable.

BRIEF SUMMARY

Consequently, the object of the present invention is to obviate the aforementioned drawbacks of the current starting systems and to provide a Stop & Start starter, respectively a control method for such a starter, with the possibility of doing "reflex-starts" by making use of simple technical means, notably less complex than an alternator-starter, without having recourse to complicated power electronics for driving the starting member, and while remaining compatible with a motor vehicle fitted with a conventional electric distribution architecture.

In order to produce a Stop & Start starter with the possibility of doing "reflex-starts", the present invention proposes a control method for activating a control device of the above-mentioned kind, the method comprising notably the steps of
switching said auxiliary relay situated along said second electric switched power supply channel in order to accelerate the pinion of the starter by providing a lesser current than the maximum current to the electric motor of the starter driving said pinion,
determining the rotation speed of the ring gear kinematically linked with the crankshaft of said engine,
determining the duration of the acceleration phase of the pinion in order to obtain a rotation speed of said pinion corresponding to the rotation speed of said ring,
once the rotation speeds of said pinion and of said ring have been synchronized, carrying out the engagement of said pinion of the starter in said ring of the engine by powering the solenoid in a manner appropriate for its type, switching said first switched power supply channel in order to supply the maximum current to the electric motor of the starter driving said pinion in order to start the engine, once the combustion engine is running independently via the combustions, carrying out the disengagement of said pinion of the starter from said ring of the engine and disconnecting all power to the electric motor of the starter.

These measures produce an S&S starter of which the pinion can be made to rotate before it is engaged in the ring gear of the heat engine, in order to synchronize the rotation speeds of these elements before their engagement. Moreover, because of the use of a weaker current than the maximum current used for a normal start, this acceleration phase of the pinion does not load the vehicle's onboard system as much as the normal start and reduces the electro-mechanical stresses on the starter, which is favorable to the level of noise and wear of the device.

This method can be further improved by making a certain number of corrections during the determination of various parameters, for example by determining the rotation speed of said ring gear by taking account of the oscillations of the rotation speed of the crankshaft of the engine due to the compression and expansion cycles through a corresponding correction, this correction being able to be proportional to the period of said oscillations. Likewise, the duration of the acceleration phase of the pinion can be determined by using either a table comprising acceleration times associated with the corresponding speed of the pinion of the starter or a physical model of the starter used by the control electronics, while taking account of the factors influencing the time of bringing the starter up to operating speed, such as the electric power supply voltage, the temperature of the starter, the state of the battery and the age of the starter.

Moreover, before engaging the pinion of the starter in the ring gear of the engine by powering the solenoid, preferably, the auxiliary relay situated along said second switched power supply channel is opened in order to achieve this engagement under zero torque.

Preferably, the steps of engaging said pinion of the starter in said ring of the engine and of switching said first switched power supply channel are carried out by means of a two-stage solenoid.

Therefore, the control method for a starter of the "Stop & Start" type described here makes it possible to very markedly reduce the cost of a starter incorporating the "reflex-start" function compared with the existing alternator-starters, while making it possible to provide equivalent performance, notably with respect to the possibility of doing a "reflex-start" and to the speed of restarts, while simultaneously reducing the complexity of the device used and minimizing the disruptive effects to the onboard electric system and the electro-mechanical stresses on the starter during the restarts of the heat engine.

BRIEF DESCRIPTION OF THE DRAWINGS

Other advantages emerge from the characteristics expressed in the dependent claims and from the description below explaining the invention in greater detail with the aid of drawings.

The appended drawings illustrate schematically and as an example one embodiment of the invention.

DETAILED DESCRIPTION

The invention will now be described in detail with reference to the appended drawings which illustrate, as an example, one embodiment of the invention.

Figure 1:
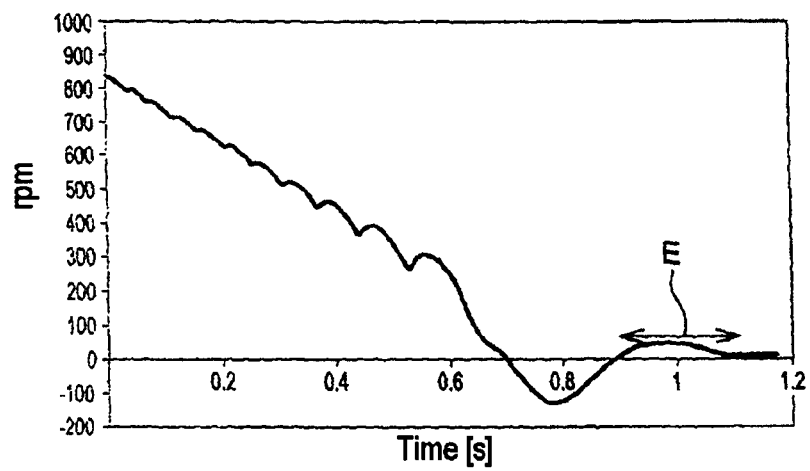
FIG. 1 represents the rotation speed of the crankshaft of a combustion engine as a function of time during a normal stop.

FIG. 1 shows the rotation speed of the crankshaft of a combustion engine as a function of time during a normal stop and shows that the engagement zone E of the pinion of a conventional starter with the ring gear kinematically linked with a crankshaft of a combustion engine is situated normally, that is to say during a normal start, in a phase in which the crankshaft is already or almost immobile, with a rotation speed of 20-40 rpm as a maximum. In these conditions, an engagement of the pinion in the ring gear can be carried out without risk as is done currently in a conventional starter.

On the other hand, in the case of a reflex-start as mentioned in the introduction and desired as an additional function for a Stop & Start starter, this condition is not fulfilled because the engine, respectively its crankshaft, is not yet at rest. The present invention therefore proposes a solution for a device and a method for electromechanically controlling the electric power supply of a Stop & Start starter which can carry out such a reflex-start when the crankshaft of the engine is still in rotation with a fairly high speed.

Figure 2:
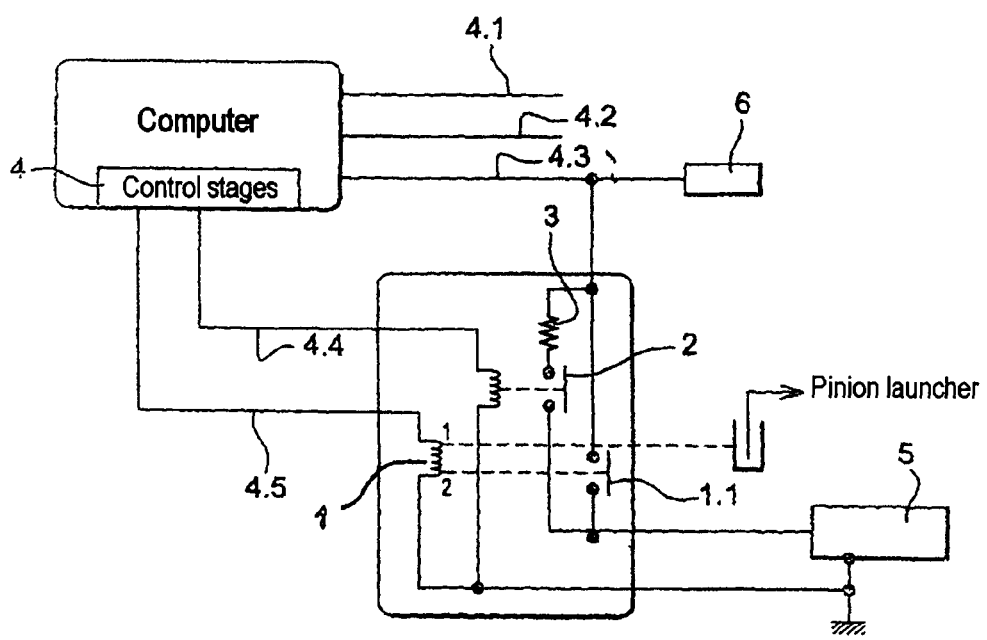
FIG. 2 is a schematic view of an embodiment of a control device according to the present invention.

In one embodiment as illustrated in FIG. 2, the control device designed to be incorporated into a starter 5 for a combustion engine according to the present invention comprises a solenoid 1 controlling the position of a pinion of the starter 5 which is, as is usually the case, suitable for engaging in a ring gear kinematically linked with a crankshaft of said engine. The pinion can be driven by an electric motor of the starter 5 by closing a first electric switched power supply channel between a battery 6 and the starter 5, the electric motor then being powered by a maximum current in order to obtain a rapid start of the heat engine. Moreover, the device comprises an auxiliary relay 2 and at least one power resistor 3 placed in series producing a second electric switched power supply channel in parallel with said first switched channel and making it possible to power, via a weaker power supply current than the maximum current, the electric motor of the starter 5 driving said pinion. FIG. 2 shows schematically that, in this embodiment, said solenoid 1 is a two-stage solenoid. In this case, the power supply of the coil of the solenoid 1 at a first current level, indicated by the FIG. 1 beside said coil in FIG. 2, makes it possible to control the position of said pinion of the starter 5, that is to say its engagement or disengagement with the ring gear linked to the crankshaft as symbolized by an arrow in FIG. 2, and the power supply of the coil of the solenoid 1 at a second current level, indicated by the FIG. 2 beside said coil in FIG. 2, makes it possible to power, via the maximum current, said electric motor of the starter 5 by closing a power contactor 1.1 which is along said first switched power supply channel, the electric motor then driving the pinion and, through it, the ring gear and the crankshaft of the engine. The power control device then mainly consists of the association of a two-stage solenoid starter drive assembly, a power relay and at least one power resistor, and corresponding control electronics of the coil of the solenoid starter drive assembly and of the coil of the auxiliary relay.

In order to describe these portions in greater detail, it should be noted that a two-stage solenoid starter drive assembly makes it possible to obtain two stable powered positions of its mobile core as a function of the current powering the single coil, while a conventional starter drive assembly comprises an "inrush coil" and a "hold coil" and carries out in an indissociable manner the engagement of the pinion and the closure of the power contactor. At rest, that is to say with no electric power supply to the coil of the solenoid 1, the pinion is then not engaged in the ring gear of the engine and the power contactor 1.1 of the starter is open. In the first intermediate position, corresponding to a first current level, the pinion is engaged with the ring gear, but the contactor 1.1 is not closed, this being able to form a stable state. Finally, in the second position, the travel of the core of the solenoid is at maximum and the pinion is engaged and the contactor 1.1 is closed so that the starter drives the crankshaft in order to start the engine. It remains to be noted here that a two-stage single-coil solenoid starter drive assembly does not as such constitute a novel aspect, but that, on the other hand, its incorporation into a device according to the present invention makes it possible to simplify it, notably to reduce the number of components and therefore its cost and its weight. Whether or not the pinion is engaged in the ring gear, the closure of the auxiliary relay 2 still makes it possible to rotate the pinion.

With respect to the additional components compared with a conventional starter comprising a solenoid starter drive assembly which are the auxiliary relay 2 and the power resistor or resistors 3, they are preferably installed on the body of the starter 5. The auxiliary relay may for example be installed on the sides of the solenoid 1 on the nose which serves as a fastening flange of the starter 5 which is a part specific to each application. The power resistor or resistors 3 may for example be made on the surface of the body of the starter in order to benefit from the thermal inertia of the latter for clearing away the temporarily dissipated heat. A first embodiment may be based on metal strips that are interconnected and pressed against the body while inserting an electrically insulating but heat conducting film. Another worthwhile embodiment is to deposit a conductive ink on the surface of the insulated body by means of an insulating dielectric layer. This embodiment is known under the name of thick layer heating element. Such an arrangement makes it possible to have a complete assembly without having to carry out additional electrical connection operations during the installation of the Stop & Start starter on the heat engine and in the vehicle during manufacture.

As shown in FIG. 2, the electrical interconnections may be carried out, in a device according to the present invention, in the following manner. The power contactor 1.1 of the two-stage solenoid 1 is used to produce a first electric switched power supply channel directly between the battery 6 and the electric motor of the Stop & Start starter 5. The auxiliary relay 2 in series with at least one power resistor 3 creates a second electric power supply channel between the battery 6 and the electric motor, placed in parallel with the first power supply channel and characterized by a weaker power supply current than the maximum current supplied during a direct powering. It is therefore possible to clip the current peak when starting, notably during the acceleration phase of the pinion in order to synchronize its rotation speed with that of the ring gear and therefore to reduce the collapse of the voltage of the onboard system during a restart of the reflex-start type.

As mentioned briefly above, the control device also comprises control electronics 4 suitable for controlling the coil of the solenoid 1 and the coil of the auxiliary relay 2 in order to control the position of the pinion of the starter 5 and in order to supply the electric motor of the starter 5 either via the first switched power supply channel between the battery 6 and the starter 5 via the maximum current or via the second switched power supply channel via a lesser current. For this purpose and as indicated schematically in FIG. 2, the control stages of the control electronics 4 have notably a first input 4.1 for measuring the position of the crankshaft of the engine, a second input 4.2 for reading the information relating to the thermal state of the engine and of the starter, and a third input 4.3 for a signal reflecting the state of the voltage of the battery 6. Moreover, the control stages have at least a first control output 4.4 for the coil of the auxiliary relay 2 and a second control output 4.5 for the coil of the solenoid 1. The control electronics 4 of the coils of the solenoid starter drive assembly and of the auxiliary relay may preferably control the current of said coils by means of control stages using choppers also called PWM. In particular, this type of chopper can be used to improve the response time of the two actuators used in the present device. The control stages are preferably integrated into an electronic computer provided in the architecture of the vehicle, which can combine other preexisting functions. Alternatively, depending on the technico-economic circumstances of the specific motor vehicle project, the control stages may also be mounted on the starter 5 with some or all of the electronics dedicated to the Stop & Start function respectively notably to the reflex-start function.

Figure 3:
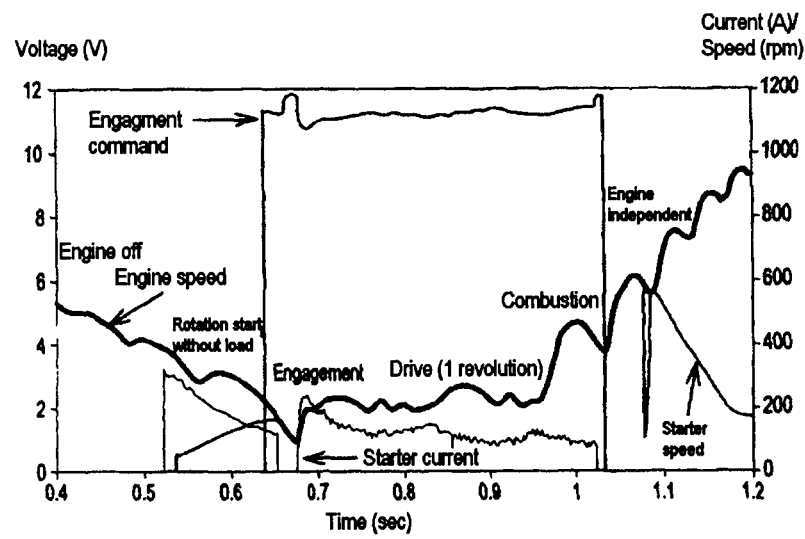
FIG. 3 represents the rotation speed of the crankshaft of the engine and of the pinion of the starter as a function of time during a reflex-start carried out with a starter according to the present invention.

So as to turn now to the operation of such a control device respectively of a corresponding starter, the latter can be easily understood by describing the method of control according to the present invention, this description making reference in a general manner to FIG. 3.

Specifically, in a situation requiring a "reflex-start" as mentioned in the introduction, there are usually two possibilities: either the speed of the crankshaft of the heat engine at the time when the restart order is known is sufficient to allow a restart of the engine on its inertia, by reactivating the injection and ignition for a gasoline engine. In this case, the starter does not have to be activated; the starter is activated for engine speeds strictly lower than the speed without load, or typically of the order of 300 to 600 rpm reduced to the crankshaft for a motor vehicle starter with excitation by permanent magnets. Or the speed of the engine has fallen below a certain threshold and it is considered that it must be assisted with the aid of the starter in order to restart it. The driving phase must then take place as quickly as possible in order to limit the driving unpleasantness felt by the driver and even to prevent problems of safety associated with the absence of torque of the heat engine in order to ensure the mobility of the vehicle. In this case, the difficulty to solve lies, as already mentioned above, in the fact that the engagement of the pinion must be carried out without delay on a rotating ring gear. With the aid of an anticipated preengagement action between the pinion of the starter 5 and the ring gear kinematically associated with the crankshaft of the engine at the beginning of the complete stop phase of the engine, it is possible to be ready with a connection that is already protected at the time of a request to restart the engine.

In order to achieve this engagement for the purpose of a reflex-start, the control method according to the present invention for activating a device for controlling an electric starter first of all comprises a first step which consists in switching the auxiliary relay 2 situated along said second switched power supply channel in order to accelerate the pinion of the starter 5, this being done by supplying a current that is weaker than the maximum current to the electric motor of the starter 5 driving said pinion. In other words, the pinion of the starter 5 is rotated "with no load", that is to say before its engagement with the ring gear. Because the electric motor of the starter 5 is supplied through a ballast resistor, the collapse of the onboard system is greatly attenuated. Evidently, the starter is supplied in this instance more to create a speed of rotation of the pinion than to supply a considerable torque, unlike the case of a conventional start where it is necessary to overcome the compression torque of the heat engine. Increasing the impedance of the power supply source by the insertion of the ballast resistor into the circuit therefore has a slight effect on the rotation of the pinion of the starter, since the current required by the starter is less "without load".

Then, during a second step of the method, the rotation speed of the ring gear kinematically linked with a crankshaft of said engine must be determined. In general, the control method driven by the control electronics 4 of the device uses external information coming via the inputs 4.1, 4.2 and 4.3 mentioned above, notably relating to the position of the crankshaft of the engine. The position of the crankshaft is conventionally an item of information already acquired by the injection computer via a sensor called TDC (Top Dead Center) which reads the passage of the teeth of a target mounted on the engine flywheel and typically delivers some sixty pulses per crankshaft revolution. Preferably, a TDC sensor operating also at a very low rotation speed, notably also at a speed well below the idle speed of the engine, and capable of correctly detecting the rotation inversions of the crankshaft is used in the context of the present invention.

Figure 4:
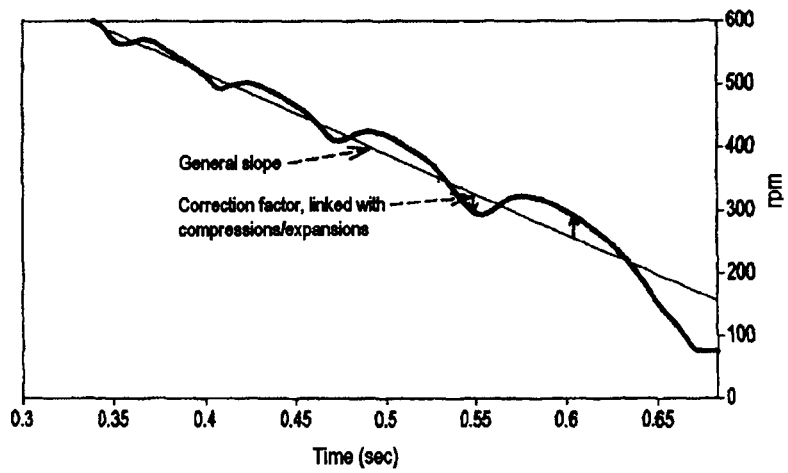
FIG. 4 shows an estimate of the rotation speed of the crankshaft as a function of time after the engine stops.

In detail, in order to determine the target rotation speed to be reached by the pinion, use is made of the TDC sensor in order to ascertain the speed of the ring gear of the heat engine in the following manner. Each time a new tooth of the target passes beneath the sensor, the real rotation speed is updated by inverting the time that has elapsed since the previous tooth. With a series of rotation speed points read off over several cycles, the computer determines the general gradient of decrease of the rotation speed of the crankshaft which is moreover an image of the dissipating friction in the heat engine, an example for such a general gradient being illustrated in FIG. 4. This straight line then makes it possible to estimate the value of the rotation speed of the crankshaft at a future moment. In contrast, at low speeds, without combustion, the rotation speed of the crankshaft oscillates substantially with each passage of Top Dead Center, notably so that a local drop in the rotation speed is noted in compression and a local rise in rotation speed in expansion. Accordingly, in order to refine the prediction of the rotation speed of the crankshaft, it is preferable to add a corrective term in order to take account of the compressions and expansions, which is possible by making use of the information of the crankshaft position in order to determine the term to be added to the expansion phases and the term to be subtracted from the compression phases. This correction is also illustrated, as an example, in FIG. 4. Preferably, the correction may be made by using a table of multiplication factors indexed according to the angle of the crankshaft, the factors being used to weight the period measured between two teeth of the target of the engine flywheel. Additionally, the correction may also be amplified proportionally with the period of the oscillations in order to take account of the increase in the oscillations with the reduction in the rotation speed. Elements of the heat engine such as the butterfly casing, the butterfly valve and the auxiliaries such as the compressor or the alternator are activated in a predetermined state, so as to minimize their influence on the speed of reduction of the rotation speed.

Once the target rotation speed to be achieved by the pinion is known, a third step of the method is used to determine, by means of the control electronics 4, the duration of the acceleration phase of the pinion which is necessary to obtain a rotation speed of said pinion corresponding to the rotation speed of the ring gear, give or take the drive ratio. The computer of the control electronics 4 determines the duration of the powering phase of the electric motor so as to have a rotation speed of the pinion that is as close as possible to that of the ring gear after this acceleration phase for the purpose of an engagement of the pinion with the ring gear. Preferably, the rotation speed of the pinion may be slightly lower than that of the ring gear. Specifically, on the one hand, the rotation speed of the ring gear reduces generally over time and, on the other hand, the ring gear taking the pinion to a rotation speed that is slightly higher than that of the starter rotor, give or take the drive ratio of the reduction gear of the starter if there is one, the free wheel of the starter is likely to decouple the pinion from the rotor. Less inertia brought to the pinion is then a factor that makes it easier to place the pinion in the ring gear.

In order to fix the duration of said initial powering phase of the electric motor, use is preferably made of a data table integrated into the electronic computer which comprises a series of times for powering the electric motor, which are sampled moments of which a typical period is of the order of 10 milliseconds, with which the corresponding rotation speeds of the pinion of the starter are associated. This table is normally obtained from the laboratory measurement on a representative batch of starter production. Alternatively, it is possible to use a physical model of the starter which will be used in the computer.

Also during this step, the control electronics 4 may use external information from the inputs 4.1, 4.2, 4.3 mentioned above, such as the voltage of the onboard system and an item of information on the thermal state of the starter or of the engine. The voltage is easily measurable and therefore available in the computer. The temperature of the starter is preferably estimated rather than measured with a sensor which would involve extra cost. Such an estimate may for example use the outside temperature and the temperature of the heat engine which are usually already measured on the motor vehicle, the elapsed time of the journey, the power dissipated in the electric motor of the starter calculated from the effective current in the last restarts carried out and the average speed of the vehicle. It is therefore possible to take account of the factors influencing the time for bringing the starter up to operating speed which are, among other things, the power supply voltage, the temperature of the starter, the state of the battery reflected, for example, by its internal resistance. An adequate correction can then be applied by using either several tables produced at different voltage and/or temperatures or corrective functions to be applied to the main table, in order to obtain the duration of the acceleration phase of the pinion with a high degree of precision.

After having synchronized the rotation speeds of the pinion and of the ring gear, give or take the drive ratio, the engagement of the pinion of the starter 5 in the ring gear of the engine is carried out by powering the solenoid 1 during a fourth step of the method. The moveable core of the solenoid then, as usual in an S&S starter, brings the pinion into a position in which it meshes with the ring gear, with the notable difference that the two elements are in rotation because of the anticipated moment of this engagement.

In a preferred form of execution of the control method, once the electronic control computer has fixed the time required for closure of the auxiliary relay 2 in order to achieve the synchronization of the rotation speeds of the pinion and the ring gear, the power to the electric motor of the starter 5 is switched off, after the passing of this time, in order to achieve the engagement of the pinion at a zero torque of the starter in order to reduce the stresses on the teeth at the moment of engagement. The powering of the solenoid 1 corresponding to the engagement of the pinion and the opening of the auxiliary relay 2 must be anticipated in order to take account of the reaction times of these electromechanical actuators. The use of an electronic rapid-reaction chopper for controlling the corresponding coils makes it possible to make the control more robust by reducing the need for anticipation of the instructions.

A fifth step of the method then provides for the switching of said first switched power supply channel in order to supply the maximum current to the electric motor of the starter 5 driving said pinion to start the engine. Specifically, being in the situation of a pinion engaged in the ring gear following the fourth step of the method, this reestablishes the current in the starter for the conventional phase of driving of the heat engine by the starter as soon as an interruption of the powering of the starter has been carried out just before the engagement of the pinion as suggested in the preferred form of execution of the fourth step of the method mentioned above. In the situation in which the starter is coupled to the heat engine, it is actually preferable to use the powering of the starter under maximum power. When the speed of the starter known after the step of setting in rotation "under no load" and/or known by the TDC sensor, since now the pinion is meshed in the ring gear, is situated above a minimum threshold corresponding to a minimum voltage level of the counter-electromotive force of the starter, the two-stage solenoid starter drive assembly 1 is consequently powered in order to have the maximum travel of the moveable core of the solenoid 1 and thus in order to activate the power contactor 1.1. The starter 5 then, by means of the pinion, rotates the crankshaft of the heat engine in order to start the engine. If necessary, the minimum speed of the starter can be obtained by a preliminary phase of the fifth step of powering via the auxiliary channel for a sufficient period to reach said minimum threshold.

Finally, once the combustion engine is running independently via the combustions, during a sixth step of the method, the disengagement of the pinion of the starter 5 from the ring gear of the engine is carried out and all power supply to the electric motor of the starter 5 is switched off, the heat engine having restarted. It is possible to note here that the duration of the driving phase should be as short as possible, which can be obtained by appropriate strategies applied in the injection computer of the engine. Typically, this driving phase is approximately a fraction of a crankshaft revolution.

The succession of the aforementioned events after the switching off of the engine is shown in FIG. 3 with the aid of the representation of the rotation speed of the crankshaft of the engine and of the pinion of the starter as a function of time during a reflex-start carried out with a starter according to the present invention. Therefore, it can be seen that, while the rotation speed of the crankshaft reduces following the switching-off of the injection of the heat engine, at a given moment, the electric motor of the starter is powered by a specific current then producing the increasingly rapid rotation of its pinion when it is set in rotation under no load. The rotation speeds of the pinion and of the crankshaft converge in order to be finally synchronized. At this moment, the current—normally weaker than the maximum current, but not necessarily—is preferably switched off in order to achieve the engagement of the pinion of the starter with the ring gear kinematically linked with the crankshaft of the heat engine, with the aid of the two-stage solenoid. The rotation speeds of the pinion and of the crankshaft then reduce slightly, then the electric motor of the starter is again powered, normally with the maximum current, in order to drive the crankshaft via the starter. Finally, the combustion of the heat engine starts and the current of the starter can be switched off and the pinion can be separated from the ring gear, the rotation of the pinion then ceasing in order to be ready for a new starting cycle.

As shown by the detailed description of the electromechanical control device and even of its control electronics 4 of the coils and of the method according to the present invention for setting it in action, the device and the method use simple, low-cost means for performing the "reflex-start" function on a starter of the S&S type. The method according to the present invention notably provides performances that are equivalent to an alternator-starter, in particular with respect to the possibility of carrying out a "reflex-start" and the speed of restarts, while minimizing the disruptive effects to the onboard electric system during restarts of the heat engine, by simultaneously reducing the complexity of the device used and consequently minimizing the corresponding cost of such a starter.

It is evident that the device respectively the method of control according to the present invention and a corresponding starter can be used on any vehicle with an internal combustion engine. Preferably, its use is intended in motor vehicles, trucks or means of public transport such as a bus fitted with a heat engine.

The invention claimed is:

1. A control method for activating a control device configured to be incorporated into a starter for a combustion engine, the device comprising a solenoid controlling a position of a pinion of the starter configured to be engaged in a ring gear kinematically associated with a crankshaft of the engine, the pinion configured to be driven by an electric motor of the starter by closing a first switched power supply channel between a battery and the starter, an auxiliary relay, and at least one power resistor placed in series creating a second switched power supply channel in parallel with the first switched channel and making it possible to power, via a power supply current that is weaker than the maximum current, the electric motor of the starter driving the pinion, the method comprising:

switching the auxiliary relay situated along the second switched power supply channel to accelerate the pinion of the starter by providing a lesser current than the maximum current to the electric motor of the starter driving the pinion;

determining in a predictive manner a rotation speed of the ring gear kinematically linked with the crankshaft of the engine;

determining in a predictive manner a duration of an acceleration phase of the pinion to obtain a rotation speed of the pinion corresponding to the rotation speed of the ring;

once the rotation speeds of the pinion and of the ring have been synchronized, engaging the pinion of the starter in the ring of the engine by powering the solenoid;

switching the first switched power supply channel to supply a maximum current to the electric motor of the starter driving the pinion to start the engine; and once the combustion engine is running independently via combustion, disengaging the pinion of the starter from the ring of the engine and disconnecting all power to the electric motor of the starter.

2. The method as claimed in claim 1, wherein the rotation speed of the ring gear is determined in a predictive manner by taking account of oscillations of the rotation speed of the crankshaft of the engine due to compression and expansion cycles through a corresponding correction, the correction being proportional to the period of the oscillations.

3. The method as claimed in claim 1, wherein
the duration of the acceleration phase of the pinion is determined by using either a table comprising acceleration times associated with the corresponding rotation speed of the pinion of the starter or a physical model of the starter.

4. The method as claimed in claim 3, wherein
the duration of the acceleration phase of the pinion is determined by taking account of factors influencing a time for bringing the starter up to operating speed, or a power supply voltage, a temperature of the starter, and a state of the battery.

5. The method as claimed in claim 1, wherein,
before engaging the pinion of the starter in the ring of the engine by powering the solenoid, the auxiliary relay situated along the second switched power supply channel is opened to achieve engagement under zero torque.

6. The method as claimed in claim 1, wherein
the engaging the pinion of the starter in the ring of the engine and switching the first switched power supply channel are carried out by a two-stage solenoid.

7. An application of the method as claimed in claim 1 in a starter for a combustion engine, the method making it possible to restart the engine before a crankshaft of the engine is at rest.

8. An application of the method as claimed in claim 1, in a vehicle with a combustion engine.

9. A non-transitory computer readable medium storing a program that, when executed by a computer, causes the computer to execute the method as claimed in claim 1.

10. A computer, comprising circuitry to execute the method as claimed in claim 1.

* * * * *